(12) United States Patent
McKee et al.

(10) Patent No.: US 7,473,170 B2
(45) Date of Patent: Jan. 6, 2009

(54) OFF-CENTER PIVOT, TWO-BOLT VANE ADJUSTMENT FOR COMBINE HARVESTERS

(75) Inventors: John M. McKee, Lititz, PA (US); Herbert M. Farley, Elizabethtown, PA (US); Wayne T. Flickinger, New Providence, PA (US); J. Cole Severs Sanford, Leola, PA (US)

(73) Assignee: CNH America LLC, New Holland, PA (US)

( * ) Notice: Subject to any disclaimer, the term of this patent is extended or adjusted under 35 U.S.C. 154(b) by 16 days.

(21) Appl. No.: 11/712,054

(22) Filed: Feb. 28, 2007

(65) Prior Publication Data

US 2008/0207287 A1 Aug. 28, 2008

(51) Int. Cl.
*A01F 12/28* (2006.01)
(52) U.S. Cl. .............................. 460/109; 460/62; 460/94
(58) Field of Classification Search .................. 460/59, 460/62, 66, 67, 71, 72, 107–110, 80, 83, 460/84
See application file for complete search history.

(56) References Cited

U.S. PATENT DOCUMENTS

| 253,874 | A | 2/1882 | MacDonald |
| 990,007 | A | 4/1911 | Reason |
| 4,244,380 | A | 1/1981 | DePauw et al. ............. 130/27 T |
| 4,258,726 | A | 3/1981 | Glaser et al. ............... 130/27 L |
| 4,408,618 | A | 10/1983 | Witzel .......................... 130/23 |
| 4,541,441 | A | 9/1985 | Ichikawa et al. ........... 130/27 T |
| 4,574,815 | A | 3/1986 | West et al. .................. 130/27 T |
| 4,611,605 | A | 9/1986 | Hall et al. ...................... 130/23 |
| 4,611,606 | A | 9/1986 | Hall et al. ...................... 130/23 |
| 4,739,773 | A | 4/1988 | West et al. ................. 130/27 R |
| 4,875,891 | A | 10/1989 | Turner et al. ................. 460/110 |
| 4,884,994 | A | 12/1989 | Hall et al. ...................... 460/66 |
| 4,969,853 | A | 11/1990 | Coers ........................... 460/80 |
| 5,334,093 | A | 8/1994 | Jensen et al. .................. 460/83 |
| 5,816,911 | A | 10/1998 | Dwyer ......................... 460/71 |
| 6,447,394 | B1 | 9/2002 | Gryspeerdt ................. 460/109 |

*Primary Examiner*—Alicia M Torres
(74) *Attorney, Agent, or Firm*—Michael G. Harms; John William Stader; Patrick M. Sheldrake

(57) ABSTRACT

An combine harvester comprises threshing and separating chambers having cover plates on which groups of vanes may be adjusted by individual tie plates utilizing an off-center pivot point for the vanes and a two-bolt system. The two-bolts being the maximum number of bolts needed to secure each vane wherein one of the bolts is an off-center pivot point while the other of the bolts extends through the cover plate to secure the tie plate for each group of vanes.

4 Claims, 6 Drawing Sheets

OFF-CENTER PIVOT, TWO-BOLT VANE ADJUSTMENT FOR COMBINE HARVESTERS

TECHNICAL FIELD

The invention relates generally to axial flow combines and more particularly to an improved crop flow control and improved vane adjustability in the threshing chambers of the combines.

BACKGROUND ART

Axial flow combines use one or more longitudinally arranged rotors which are rotated in associated chambers, which chambers are partly constituted by threshing and separating concaves. The crop material is subjected to a much longer threshing and separation cycle than in conventional combines and therefore, the efficiency of axial flow machines is greater. A higher degree of separation is reached and the grain losses are reduced.

The concaves are provided above a cleaning system and constitute the lower portion of the chamber. The top portion of the chamber comprises a curved cover which has, at its inner surface, a set of fins or vanes to guide the crop rearwardly along a spiral path to the end of the threshing and separating zone.

The pitch angle $\alpha$, of the vanes, has a direct influence on the time interval the crop remains inside the chamber and hence on the chances for the wheat, beans, or grain to be separated from the straw or chaff. A larger pitch angle will increase the rearward speed of the crop flow, reduce the dwelling time, and increase the portion of wheat, beans, or grain which, rather than being separated through the concaves, is instead deposited onto the field, i.e, "rotor losses". To the contrary, a smaller pitch angle will reduce the rearward speed, increase the dwelling time, and reduce the "rotor losses".

There are three types of axial flow combine rotor designs, i.e., (1) the Case brand model axial flow combine which has a single rotor; (2) the New Holland brand, model axial-flow combine which has a pair of rotors mounted side-by-side; and (3) there are hybrid combines having a transverse threshing cylinder and a pair of axial separating units.

The hybrid combines are disclosed in, for example, U.S. Pat. Nos. 4,408,618; 4,574,815; 4,611,605; 4,611,606; 4,739,773; 4,875,891; 4,884,994; and 4,969,853. Adjustability of the vanes within the rotor has been an on-going issue in combine designs. Small grains, such as rice, do not have to remain in the separating zone as long as corn, so it is desirable when smaller grains are being threshed to have a steeper angle for the vanes or fins than when threshing, for example, corn. However, it is unduly time-consuming to reposition each vane individually, especially because no crop harvesting can be accomplished during the period of adjustment.

U.S. Pat. No. 4,244,380, issued to Richard A. DePauw, et al., discloses, a Case brand model single rotor machine having a means for selectively and simultaneously adjusting the position of the vanes to change the rate of movement of the crop material through the casing. A three-bolt type of vane is employed which pivots or swivels at the first or center bolt and which locks down at either end using the two remaining end bolts. The two bolts at either end of the vane each move in their respective helically cut slot and slide over to a detent which secures the bolts and the vane in a different position. A small sheet metal cover plate covers each helical slot. One drawback to this design is that since the detents are under the small cover plates, and hidden from view, one cannot immediately determine the degree to which the vane has been adjusted. Also, grain and debris tend to leak out of the slots when the end bolts are tightened down. Furthermore, there are drawbacks to using this design on the New Holland brand machines with twin rotors because there is less space to access the center bolts and the operator has more difficulty making the other adjustments needed. Additional drawbacks include the fact that the cover plate tends to rotate and will not seat properly against the top cover, perhaps owing to the instability of the pivot bolt. Finally, certain structural weaknesses of this design lead to unwarranted stresses and structural deformation for the vanes.

U.S. Pat. No. 5,334,093 attempts to address the problems associated with axial separators that comprise a pair of side-by-side axial separator units each having a rotor. Rather than adjust the vanes, they chose to simply replace the top covers and their respective vanes. Therein each axial separator unit is provided with three detachable covers having inwardly projecting spiral vanes. The first cover is provided with at least five spiral vanes. The first vane has an angle of inclination of 45°, the second, third and fourth vanes have an angle of inclination of 30°, and the fifth vane has an angle of inclination of approximately 25°. Accordingly, in small grains, such as rice, the second and third covers each have at least four vanes all with an angle of inclination of approximately 20°. For corn, the second and third covers each have at least four vanes, all with an angle of inclination of approximately 10°. The second and third covers are designated to be interchangeable depending on the crop. However, this system is undesirably time-consuming.

U.S. Pat. No. 6,447,394 discloses a New Holland brand type rotor design for the twin rotors where the pitch angle of the rotor fins has been optimized with respect to power requirements and rotor losses but are still fixed in design rather than being adjustable.

An axial flow combine side-by-side rotor design with adjustable vanes that would solve the problems of the prior art would be a significant advancement in the art and would satisfy a longfelt need.

SUMMARY OF THE INVENTION

It is a feature of the present invention that adjustable vanes or fins within a twin rotor system become surprisingly more accessible by holding them in place with only two bolts, rather than three. This is made possible by using one bolt as an off-center pivot bolt, and the other slides in a slot allowing adjustment of the vane. Also, although multiple vanes are tied together by the bars or tie plates to prevent rotation, and the tie bars or plates allow adjustment of multiple vanes at once, it is not necessary to adjust all of the vanes simultaneously. Instead, variation in pitch angle, from one group of vanes to the other, along the length of the rotor, is made possible.

It is an additional principal feature of the present invention that there are handles on the tie bars or tie plates, which plates are adjustably bolted to the rotor's top cover on the chamber. The handles facilitate efficient movement. There are also pins on the chamber top cover which, together with curved slots, for receiving each vane's end bolt, serve to permit visual awareness or indexing of the vane's $\alpha$ angle. Accordingly, the operator can readily identify and locate the position in which the vanes or fins have been adjusted. The cover plates, off-center pivot end adjustment bolts, tie-bars, etc. are more stable and structurally sound than using prior art three-bolt system, yet more efficient than having replaceable covers and other means used for optimizing power and rotor losses in prior art twin rotor systems.

DETAILED DESCRIPTION OF THE INVENTION

The terms "grain", "straw", and "tailings" are used principally within this specification for convenience as it is to be understood that these terms are not intended to be limiting, thus, "grain" refers to that part of the crop material which is threshed and separated from the discardable part of the crop material which is referred to as "straw". Incompletely threshed crop material is referred to as "tailings". Also the terms "forward", "rearward", "left" and "right", when used in connection with the combine harvester and/or components thereof are determined with reference to the direction of forward operative travel of the combine harvester, but again, they should not be construed as limiting. The terms "longitudinal" and "transverse" are determined with reference to the fore-and-aft direction of the harvester and are equally not to be construed as limiting.

Figure 1:
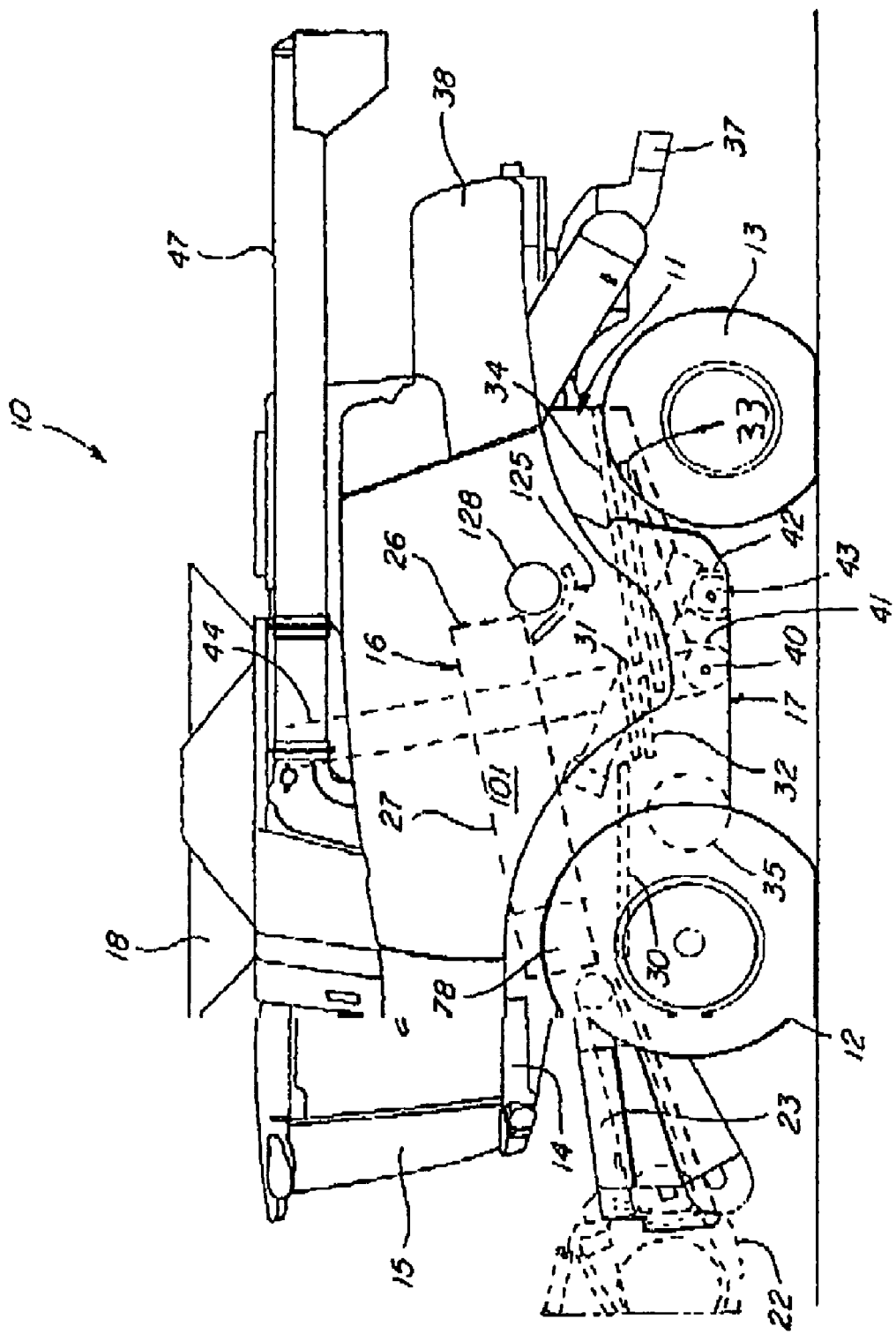
FIG. 1 is a semi-schematic side elevation of a combine harvester having axial flow threshing and separating units.

The combine harvester 10 shown in FIG. 1 of the accompanying drawings is of the axial flow type, wherein crop material is threshed and separated while it is advanced by and along a longitudinally arranged rotor. The combine harvester comprises a chassis or main frame 11 having a pair of driven, ground-engaging front wheels 12 and a pair of smaller, steerable rear wheels 13. Supported on the main frame 11 are an operator's platform 14 with an operator's cab 15, a threshing and separating assembly 16, a grain cleaning assembly 17, and a grain tank 18. A conventional header 22 and straw elevator 23 extend forwardly of the main chassis 11 and are pivotally secured thereto for generally vertical movement which is controlled by appropriate actuators, such as hydraulic cylinders (not shown).

The header and the straw elevator 23 supply the cut crop to the threshing end separating assembly 16. The threshing and separating assembly 16 comprises a pair of juxtaposed, generally cylindrical chambers 26 in which rotors 27 are rotated to thresh and separate the crop received therein, that is to say, the crop is rubbed and beaten between the rotors 27 and the inner services of the chambers 26. Thereby the grain, seed or the like is loosened and separated from the straw, stalk or cob. The chambers are described in further detail hereinafter.

Grain which has been separated by the threshing and separating assembly 16 falls onto a first grain pan 30 of the cleaning assembly 17 which further also comprises a pre-cleaning sieve 31, positioned above a second grain pan 32, a pair of sieves 33 and 34, disposed one above the other, and a cleaning fan 35.

The grain pans 30, 32 and the sieves 31, 33, and 34 are oscillated generally back-and-forth for transporting threshed and separated grain from the first grain pan 30 to the pre-cleaning sieve 31 and the second grain pan 32 and therefrom to the sieves 33, 34. The same oscillatory movement spreads said grain across said sieves 31, 33, and 34, while permitting the passage of cleaned grain by gravity through the apertures of these sieves. The grain on the sieves 31, 33, 34 is subjected to a cleaning action by the fan 35 which provides an airflow through said sieves to remove chaff and other impurities such as dust from the grain by making this material airborne for discharge from the machine through an outlet 37 of the straw hood 38. Clean grain falls to a clean grain auger 40 in a clean grain auger trough 41 and is subsequently transferred therefrom by a grain elevator 44 to the grain tank 18 for discharge out of unloading tube 47. Tailings fall to a tailings auger (not shown) in a tailings auger trough 42. The tailings are transported sideways by tailings auger to a separate rethresher 43 and returned by a tailings conveyor to the cleaning assembly 17 for repeated cleaning action.

Figure 2:
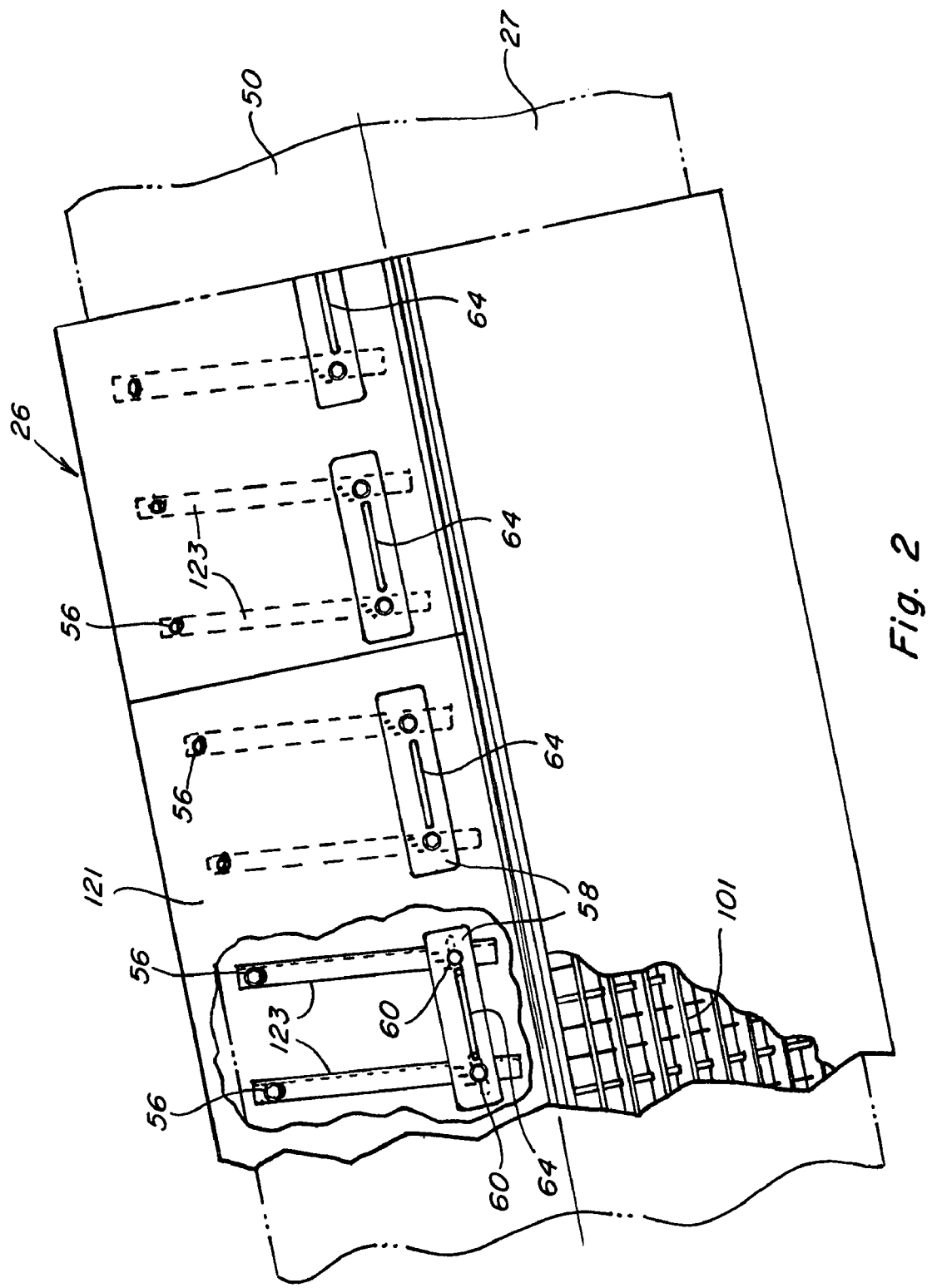
FIG. 2 is an enlarged fragmentary view of the threshing and separating chamber of an axial flow combine, showing cutout of the adjustable vanes in the top cover and showing cutout of the slats or separating grates on the lower concave assembly of the chamber.
Figure 3:
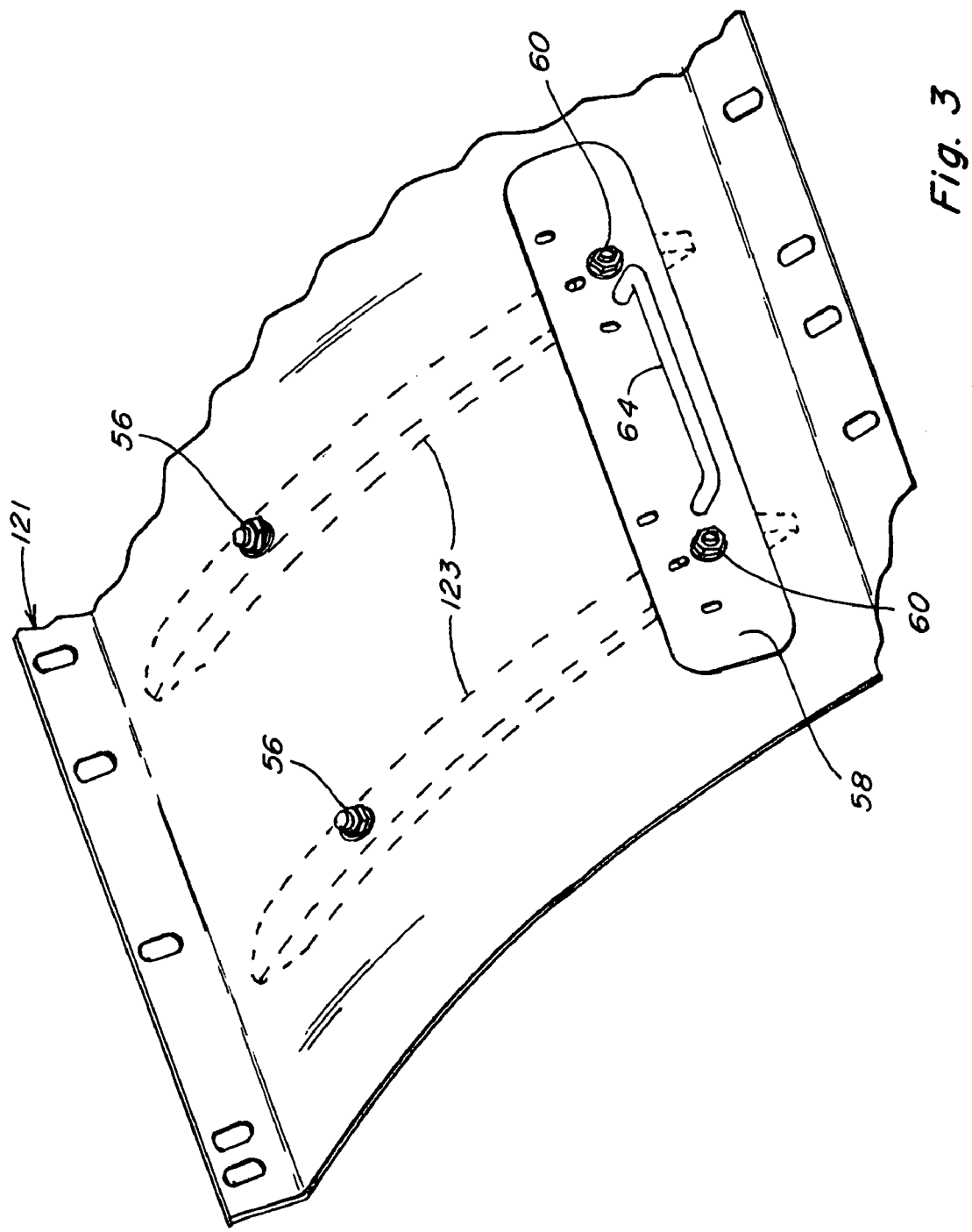
FIG. 3 is a partial perspective view of the top cover of the threshing and separating chamber.

Referring now to FIGS. 2 and 3, the lower part of the chamber 26 of the threshing and separating assembly 16 comprises a plurality of concaves or grates 101 allowing the passage of threshed and separated grain to the cleaning assembly 17. The front portion of assembly 16 has a threshing concave assembly 78.

The upper section of the threshing and separating chamber 26 comprises curved cover plates 121 as partially shown in FIG. 3. The cover plates 121 extend between and are bolted to the longitudinal profiles 115 and inner side walls 122 of the separating chambers 26 as denoted for example in FIG. 4. Each cover plate 121 is provided at its inner surface with a set of parallel vanes 123 which are arranged along spiral paths. The vanes 123 guide the threshed crop material rearwardly as it is rotated by elements (not shown) on the rotor tube 50. The pitch angle $\alpha$ at which the vanes 123 are disposed is critical with respect to grain loss and power requirement. As this angle defines, for the larger part, the axial speed at which the crop material travels along the confines of the chamber 26, it also defines the dwelling time of the crop in the separating area, i.e., adjacent the separating grates 101. A smaller pitch angle $\alpha$ will lower the axial speed of the grain and hence increase the opportunity for the grains to travel through the grates in concave 101 and reach the cleaning assembly 17. Accordingly, it may be expected that a smaller percentage of the harvested grain will reach the end of the threshing and separating chamber 26 without being separated from the straw and hence be deposited together with the straw through the harvester outlet 37 onto the field. Hence, it may be expected than grain losses at the end of the rotor 27 can be reduced by simply reducing the pitch angle $\alpha$.

On the other hand, the pitch angle will influence the energy requirements for the rotation of the rotor 27. A smaller pitch angle increases the dwelling time and hence the amount of material resent around the rotor tube 50. Hence it may be expected that a smaller pitch angle $\alpha$ will raise the energy requirements for keeping the rotor 27 rotating at full speed.

Figure 4:
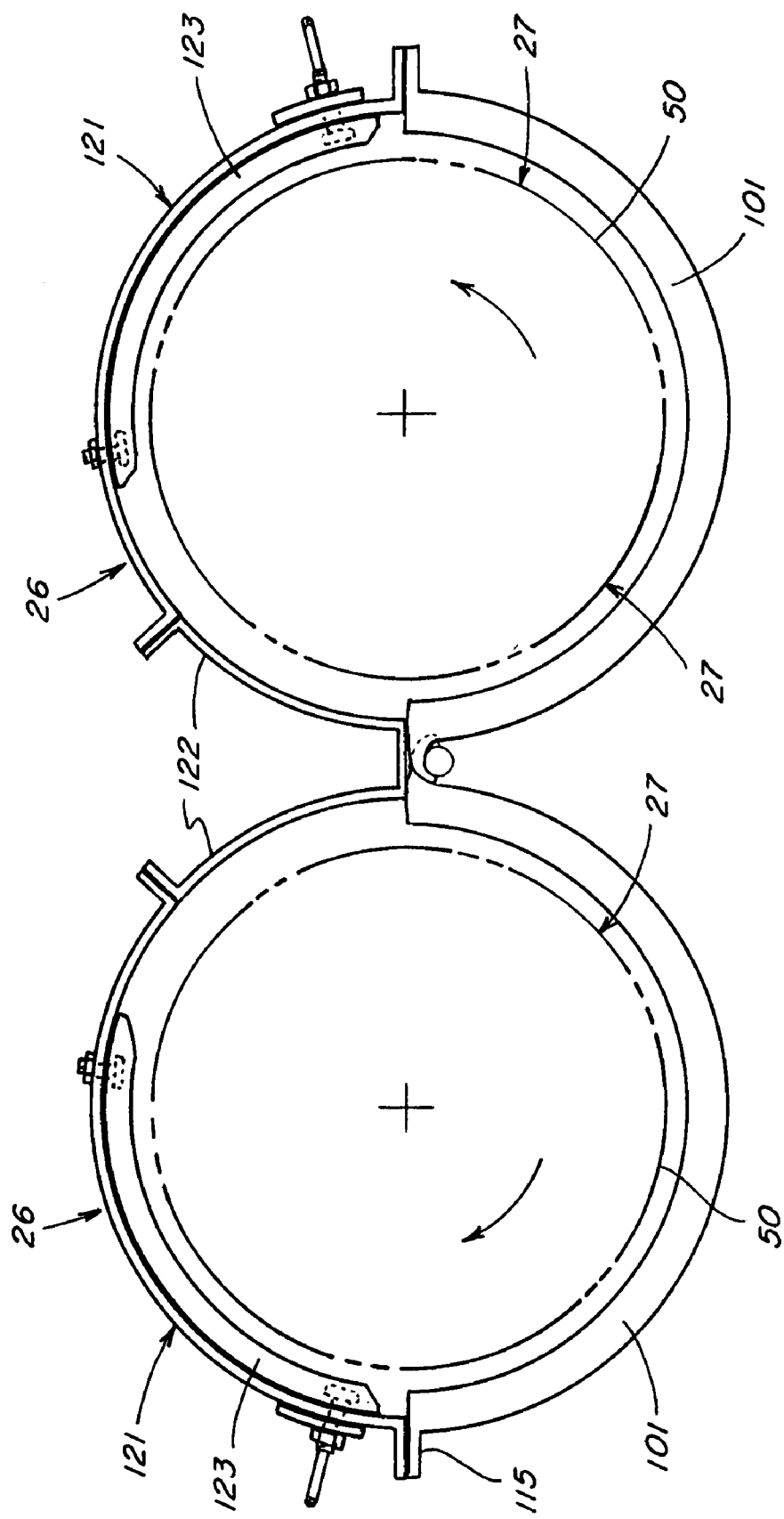
FIG. 4 is a rear view of the dual threshing and separating chambers of the combine taken in the direction of arrow I in FIG. 2.

In accordance with the invention and with reference to FIGS. 2, 3 and 4, a plurality of vanes 123 are disposed in successively spaced apart and substantially parallel relation along the interior of the cover plate 121 throughout the length of the chamber 26, whereby each vane is a segment of a circle, having a diameter conforming to that of the interior surface of the chamber 26. Each vane 123 is pivotally mounted on the cover plate 121 by an off-center nut and bolt unit 56 which defines a pivot axis disposed radially relative to the cover plate 121 of chamber 26.

A series of tie bars 58 extend longitudinally along the length of the cover plate 121 on the exterior of cover plate 121 and are pivotally secured to the lower ends of separate groups of vanes 123, preferably two vanes at a time per group, or a sufficient number of vanes to achieve the desired flow characteristics for whatever crops are being contemplated to be threshed. The tie bars are secured to the cover plate which is secured to the vanes by nut and bolt units 60 which extend through respective slots 62 defined through the cover plate 121. Unlike the prior art, there is no second tie bar mounted on the exterior of the cover plate parallel to and at the top of a first tie bar. Only one tie bar per group of vanes is needed.

Handles 64 are secured along the length of the tie bars between the nut and bolt units 60.

Figure 5:
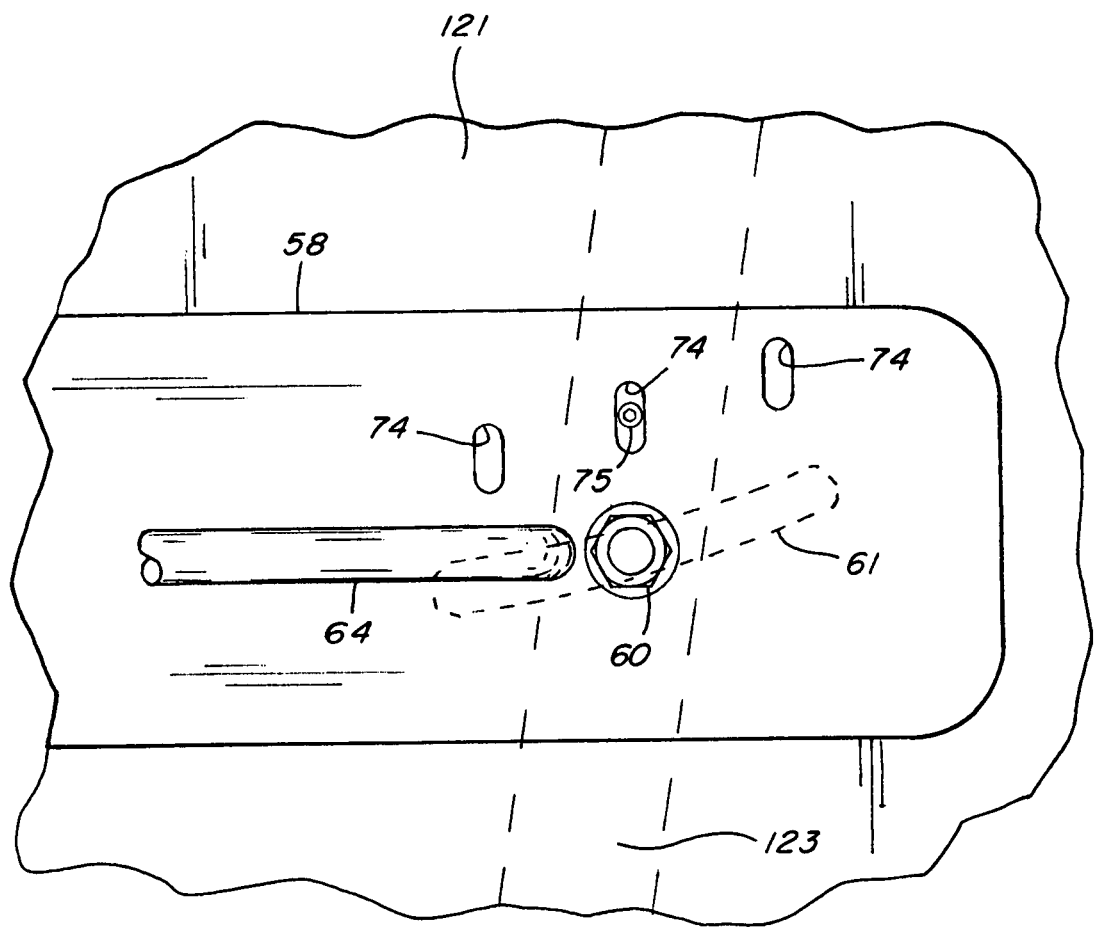
FIG. 5 is an enlarged partial view of the handle and cover plate lower bolt and indexing slots for the top cover of the threshing and separation chamber.
Figure 6:
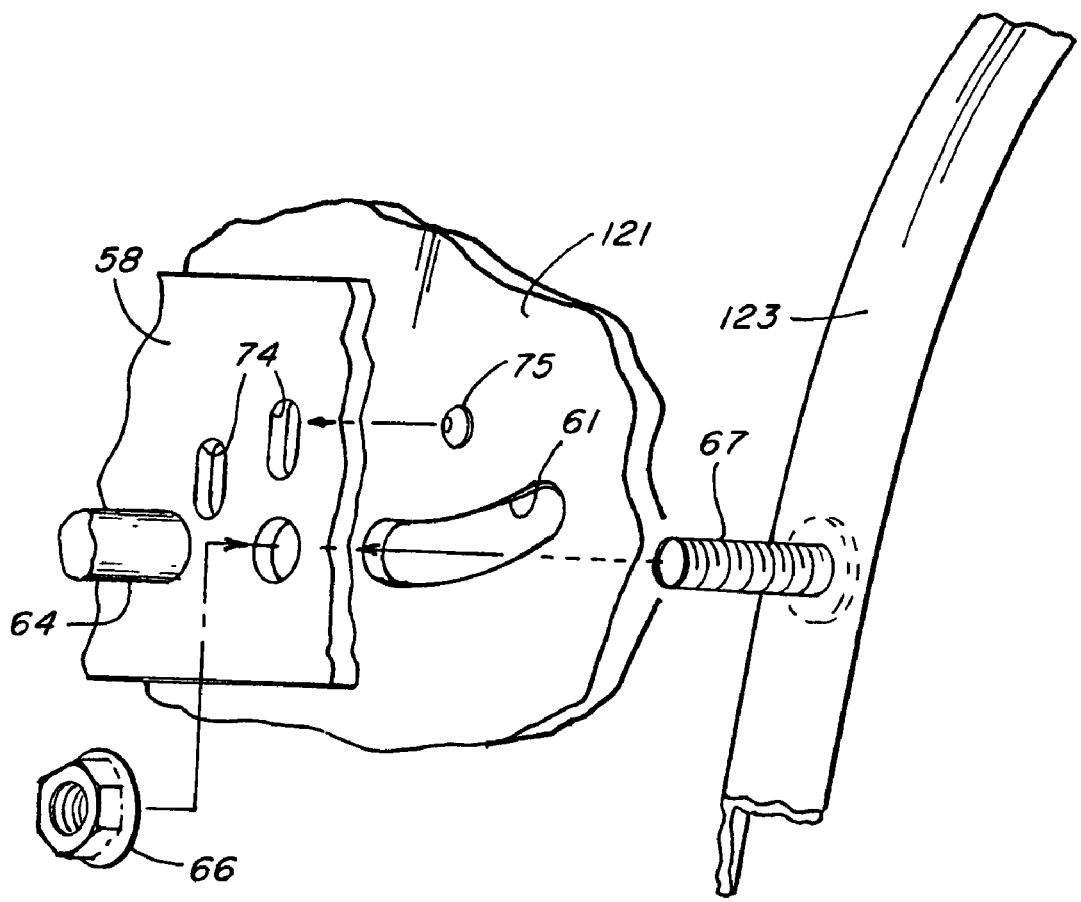
FIG. 6 is a perspective view of the details of the bolt, hex nut, and adjusting slot for the tie plate on the chamber top cover.
Figure 7:
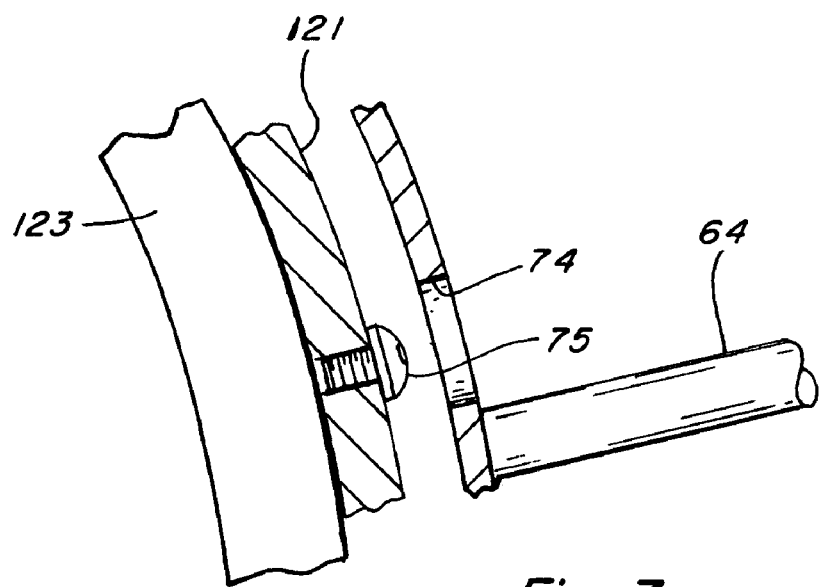
FIG. 7 shows a side view and partial cross-section of the bolt and vane elements.

Referring particularly to FIGS. 5, 6 and 7, nut and bolt units 60 include nut 66 and bolt 67, which bolt 67 is secured through vanes 123 (which are L-section structures) and on through slot 61 disposed in cover plate 121 and on through tie bar 58 where the bolt 67 together with vane 123, cover plate 121 and tie bar 58 may all be secured by nut 66. Also disposed on the cover plate 121 is a pin 75 which is placed to coincide with one of several positions that vane 123 can pivot to so as to allow pin 75 to rest in one of the several slots 74. This pin 75 thus becomes an indicator or index for the pitch angle $\alpha$ to which the vane has been moved. This allows a casual observer to determine at an instant at which pitch angle each vane has been secured. Thus, it may be possible to set a first set of vanes at and angle of inclination of for example 45°, a second, third, and/or fourth set of vanes at an angle of inclination of for example 30°, and perhaps a fifth set of vanes at an angle of inclination of for example 25°. Or for example, with small grains, such as rice, the second and third series of vanes could be adjusted to have at least four vanes all with an angle of inclination of approximately 20°. In corn, the second and third series of vanes each could be moved, if desired, so that at least four vanes all have an angle of inclination of approximately 10°. The indexing pin would serve as an indicator of the pitch angle for the various sets of vanes without having to change the cover plates of the threshing chamber. Small grains, such as rice, do not have to remain in the separating zone as long as corn, so the adjustments are designed for small grains to have a steeper angle than those designed for grains such as corn. Variation in pitch angles for particular rotor designs and crops has been offered because the optimum angle is not the same for all rotor diameters. As a general rule, the optimum angle decreases when the diameter decreases. There is a well known non-linear relationship between the optimum angle $\alpha$ and the effective rotor diameter D.

At the end of the threshing and separating assembly 16, the straw is propelled rearwardly and outwardly. The straw is not deposited directly onto the ground, but ejected onto a slanting guide 125 (shown in FIG. 1), which is attached to the rear of the separating concave assembly 121 of threshing unit 16. The guide plate 125 is adjacent to a beater assembly 128 which is positioned above the chaffer sieve 33. The beater assembly 128 further comprises other elements (not shown) for propelling the straw through the outlet 37 at the rear of the combine harvester 10. The two counter-rotating rotors 27 as shown in FIG. 4 tend to deposit most of the straw near the center of the guide plate 125. For machines operating at high capacities, the straw may build up and cause blockages in this portion of a combine harvester 10. Such blockages evolve quickly to the front of the threshing and separating assembly and may cause a complete blockage of the rotors 27. Therefore, one is encouraged to make use of the full capacity of the beater assembly 128 and hence to spread out the straw over the full width of the guide plate 125.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An axial-flow combine comprising:
   side-by-side generally cylindrical threshing and separating chambers, said chambers having generally longitudinal axes, and comprising lower separating concave grates, and upper curved cover plates with a series of vanes arranged to move harvested crop material along a helical path inside said chamber;
   at least a pair of the series of vanes each having an off-center stationary pivot point for adjusting the vane's pitch angle, the vanes each having a bolt on corresponding distal ends thereof, each bolt being movable within a corresponding slot in the upper cover plate to establish the pitch angle;
   a tie bar extending longitudinally along the length of the cover plate on the exterior of the cover plate, the tie bar is secured to the pair of vanes by nuts fastened to each of the bolts that extend through the slots of the cover plate and through the tie bar such that the tie bar slidably moves the vanes within the slots of the cover plate; and
   a pin disposed on the exterior surface of the cover plate, extendable through one of a plurality of tie bar slots, the pin providing a visual index of the angle of inclination of the vanes coupled to said tie bar, each tie bar slot being positioned on the tie bar to correspond to a particular predetermined pitch angle.

2. The combine of claim 1 wherein said tie bar has affixed thereto a handle for adjusting the pitch angle.

3. The combine of claim 1 wherein said tie bar ties groups of vanes together so that two or more separate groups of vanes can be independently adjusted, one group at a time.

4. The combine of claim 3 wherein the groups of vanes include at least two but not more than 5 vanes at a time.

\* \* \* \* \*